United States Patent [19]

Clark

[11] Patent Number: 4,688,934
[45] Date of Patent: Aug. 25, 1987

[54] ROTATING POLARIZER ANGLE SENSING SYSTEM

[75] Inventor: Larry T. Clark, Kent, Wash.

[73] Assignee: The Boeing Company, Seattle, Wash.

[21] Appl. No.: 863,654

[22] Filed: May 15, 1986

Related U.S. Application Data

[63] Continuation of Ser. No. 432,895, Jun. 30, 1982, abandoned.

[51] Int. Cl.⁴ ............................................. G01B 11/16
[52] U.S. Cl. ................................... 356/34; 250/225; 250/231 SE; 356/364
[58] Field of Search ................. 356/33, 34, 35.5, 364, 356/369; 250/225, 231 SE; 73/583, 800, 802

[56] References Cited

U.S. PATENT DOCUMENTS

| | | | |
|---|---|---|---|
| 2,998,746 | 9/1961 | Gievers | 250/225 X |
| 3,584,959 | 6/1971 | Del Carlo | 250/231 SE X |
| 3,632,215 | 1/1972 | Holtz | 250/225 X |
| 3,633,212 | 1/1972 | Cooper | 346/107 |
| 3,759,618 | 9/1973 | Rogers et al. | 356/364 X |
| 3,804,522 | 4/1974 | Smith | 356/369 |
| 3,833,302 | 9/1974 | Hock | 356/114 |
| 3,992,104 | 11/1976 | Watanabe | 356/117 |
| 4,176,951 | 12/1979 | Robert et al. | 356/33 |
| 4,179,217 | 12/1979 | Robert et al. | 356/33 |
| 4,263,810 | 4/1981 | Chiu | 73/800 |

FOREIGN PATENT DOCUMENTS

| | | | |
|---|---|---|---|
| 522425 | 9/1976 | U.S.S.R. | |
| 679787 | 8/1979 | U.S.S.R. | 250/231 SE |

Primary Examiner—Davis L. Willis
Assistant Examiner—Matthew W. Koren
Attorney, Agent, or Firm—Conrad O. Gardner; B. A. Donahue

[57] ABSTRACT

A system for measuring aeroelastic deformation of an aircraft wing in flight or in a wind tunnel utilizing light from a linearly polarized light source (101). The light is transmitted through modulating elements (104, 105) to provide a carrier beam, and a small portion of the beam is reflected through a linear polarizer (107) into a photo-detector (108) for utilization as a reference electrical signal (208). The remainder of the beam is reflected back from a retro-reflector target (700) located on the wing into another photo-detector (114) to provide the target electrical signal (209). The two amplified electrical signals are compared in a phase detector (FIG. 3) for providing an angle measurement output signal $E_0$.

1 Claim, 5 Drawing Figures

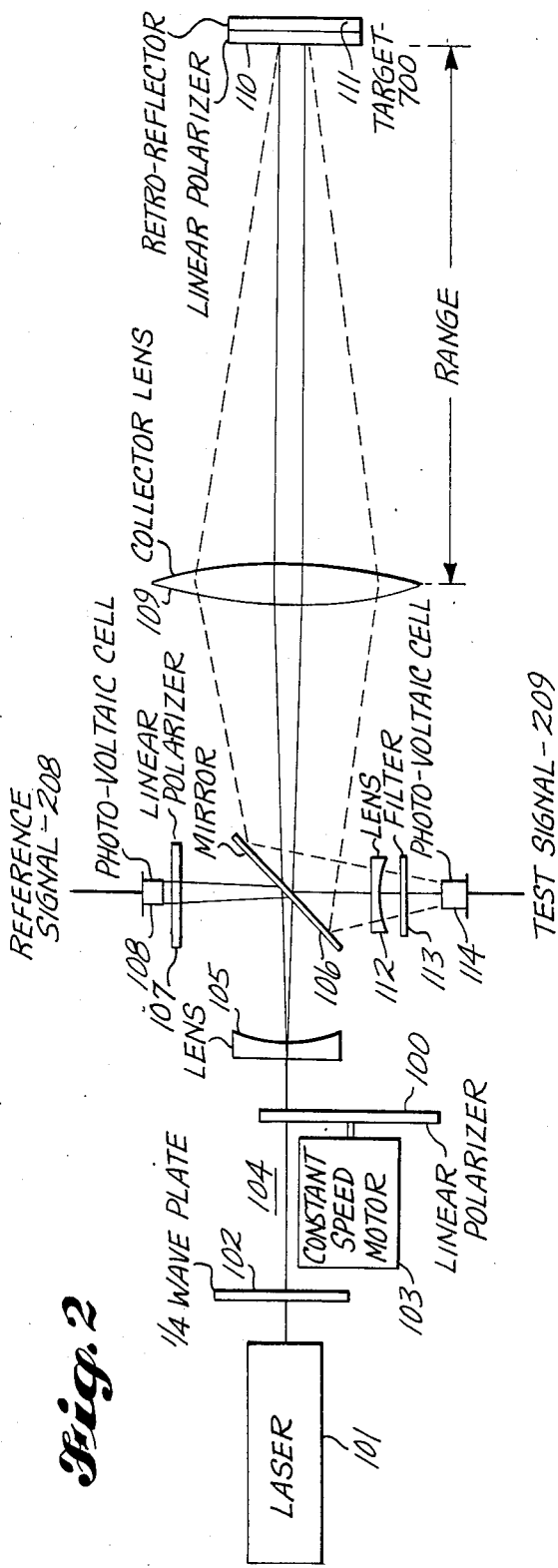
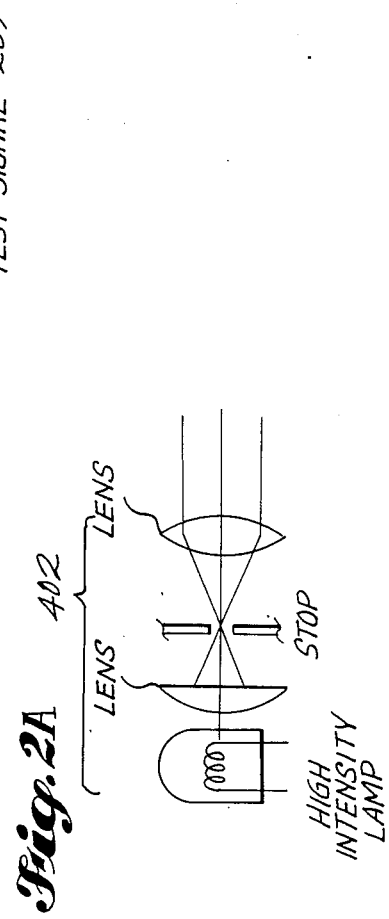

ROTATING POLARIZER ANGLE SENSING SYSTEM

This is a continuation of co-pending application Ser. No. 432,895 filed on June 30, 1982, now abandoned.

This invention relates to systems for measuring aeroelastic deformation of aircraft structure in flight or in wind tunnels and, more particularly, to a rotating polarizer angle sensor system for measuring aeroelastic deformation of an aircraft structure in flight or in a wind tunnel.

Heretofore, accelerometers have been utilized for measurement of aeroelastic deformation of aircraft structure in flight but have proved unsuitable because of sensitivity to acceleration as well as angle. Other optical methods have been utilized in wind tunnel testing but, however, have been deficient in terms of accuracy of the systems. Photogrammetric methods have also been utilized for flight testing, but have also been awkward to deploy and deficient in the measure of accuracy.

Heretofore, the patent literature, including U.S. Pat. No. 4,179,217 and 3,992,104, have utilized polarized light type systems and phase detector arrangements for comparing different parameters including inclination angles.

In contrast to the systems in the patent literature and the aforementioned prior measurement techniques, a preferred embodiment of the present invention utilizes the physical principle upon which linearly polarized light which passes through a linear polarizer relates the intensity of the transmitted light as a simple function of the angle between the axis of polarization of the incoming light and the axis of the polarizer. In a simple measurement of the intensity of the transmitted light providing an angle measurement, any effect which changes the intensity of the transmitted light (fog, smoke, refraction, etc.) would result in a change in the angle reading. As a consequence, the direct application of a system utilizing intensity would be difficult to deploy and, therefore, in accordance with the present preferred embodiment which avoids the aforementioned problem, an incident beam of light in which the axis of polarization is a function of time is utilized wherein the phase angle between a reference signal and a test signal as a measure of the angle between the axis of the reference polarizer and the axis of the test polarizer is utilized. The present rotating polarizer angle sensor system embodiment, while having remote angle measurement applicability in general, includes applications wherein deformation and vibration of structures, such as in a tiltmeter for geotechnical applications, are required, and wherein the operating range of the system is required to be from centimeters to e.g. kilometers.

Other objects, features and advantages of the present invention will become apparent from the following description read on the accompanying drawings, wherein:

FIG. 2 is a hardware system optical embodiment utilizing the principles shown in FIG. 1;

FIG. 2A is illustrative of an alternative light input arrangement which may be utilized in the system of FIG. 2;

Figure 1:
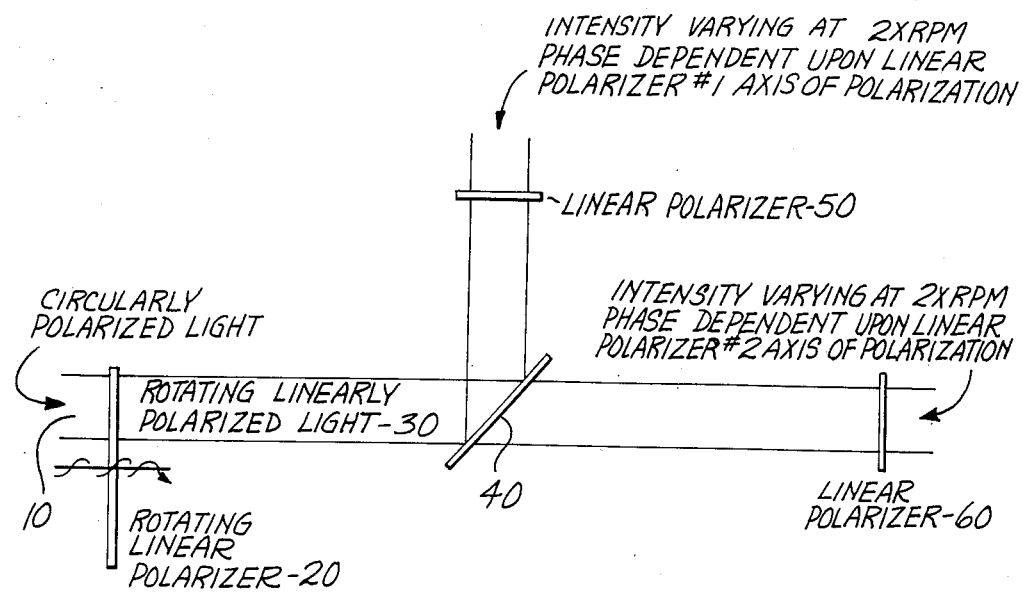
FIG. 1 is a schematic diagram utilized in explaining the principles of operation of the present rotating polarizer angle sensor system embodiment.

Turning now to FIG. 1, illustrative of the principles of operation of the present system in which an incident beam of light in which the axis of polarization is a function of time and in which the phase angle beween a reference signal and a test signal is utilized as a measure of the angle between the axis of the reference polarizer and the axis of the test polarizer, it can be seen that circularly polarized light 10 from a laser source (not shown) is passed through a rotating linear polarizer 20, thereby providing rotating linearly polarized light 30 with the axis of polarization rotating at twice the speed of polarizer rotation. Light beam 30 is divided downstream by beam splitter 40 into a reference beam and a test beam, each of which beams is coupled through linear polarizer elements 50 and 60 and, subsequently, collected by photo-detectors (not shown) which measure the time dependent intensity. The phase difference between the two signals from the detectors (as processed by the system of FIGS. 2 and 3) is directy proportional to the difference between the polarization axes of the two polarizers.

Figure 3:
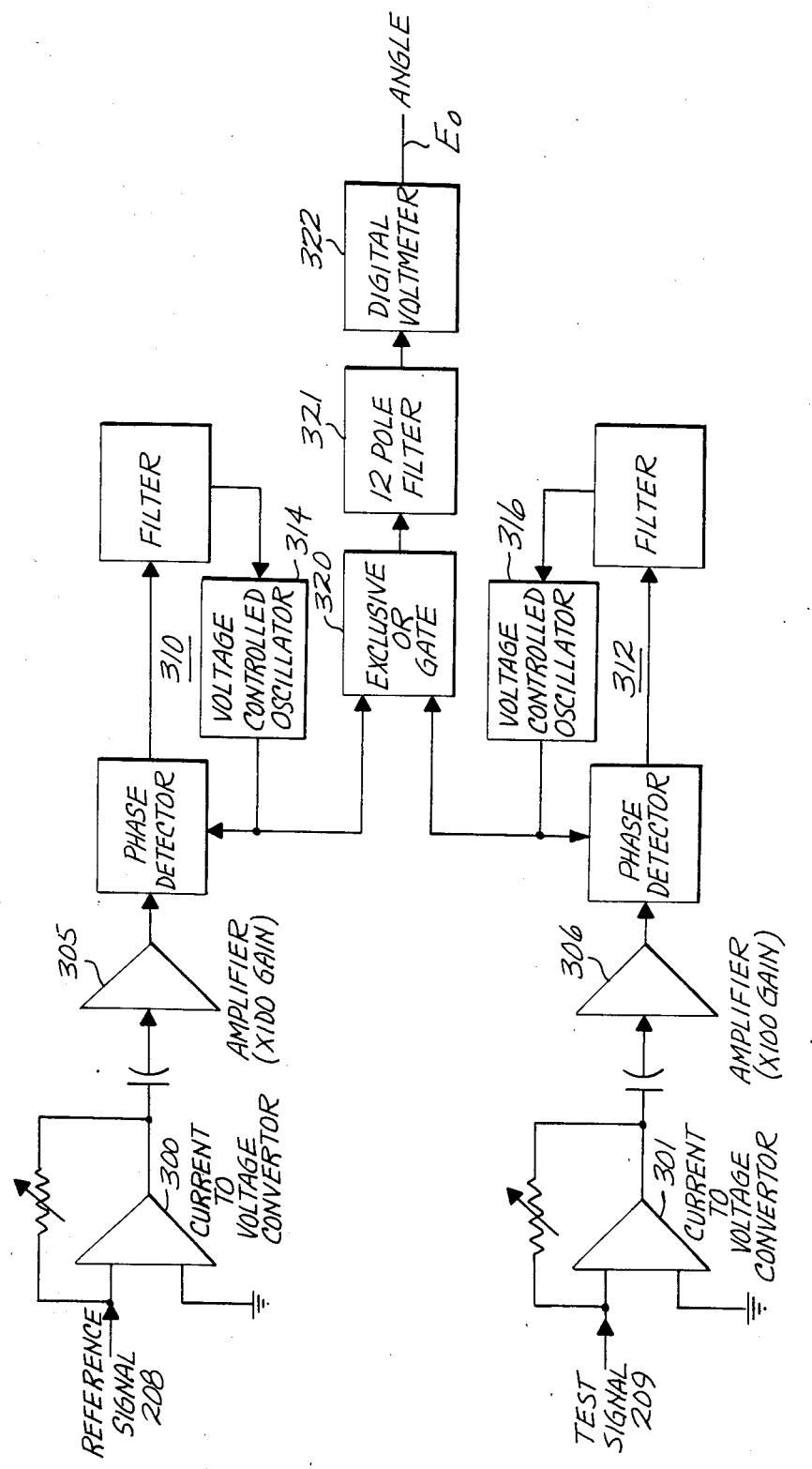
FIG. 3 is a block diagram showing signal processing of reference and test signals from the optical system of FIG. 2.

A system embodiment of the present rotating polarizer angle sensor system is shown in FIGS. 2 and 3. In FIG. 2, a light source 101 comprising a low power laser with a linearly polarized output beam is utilized. The beam is coupled through a one-fourth wave retardation plate 102 to generate the required circularly polarized light. The beam is then coupled through a rotating linear polarizer system 104 which comprises a constant speed motor 103 driving a linear polarizer 100. The frequency of rotation of the axis of polarization of the output beam from rotating linear polarizer 104 is twice that of constant speed motor 103. Subsequently, downstream the beam is coupled through expansion lens 105 and then coupled through beam splitter 106 wherein the reference and test beams separation is provided. Approximately five percent of the light is reflected from the glass surface on the back of beam splitter 106 comprising a mirror, with the rest of the light passing through a small aperture in the front surface of the mirror where the mirror coating has been removed, thereby providing the test beam. The reference beam is coupled through linear polarizer element 107 to photo-detector element 108, thereby providing reference signal 208, representative of intensity variation. The test beam is collimated by objective lens 109 to form the transmission beam projected to target 700. Target 700 comprises linear polarizer surface 110 facing the transmission beam, which linear polarizer surface 110 is sandwiched to retro-reflector element 111. Retroreflector element 111 may comprise retro-reflective tape or e.g. a corner cube reflector depending upon system application. The transmission beam striking target 700 is reflected back through linear polarizer 110 in the present system embodiment of FIG. 2 to be collected by objective lens 109. The collected beam is subsequently directed downstream by mirror element 106 through lens 112 and interference filter element 113 (set for the wavelengths of the laser light) and then is incident upon photo-detector 114. Photo-detector 114 comprises a photo-voltaic cell for ranges up to thirty meters and may comprise a photo-multiplier tube for longer range applications. Photo-voltaic detectors 108 and 114 are current sources and current to voltage converters 300 and 301, as seen in FIG. 3, are utilized to condition reference signal 208 and test signal 209 further downstream for analysis.

It can be seen further in the signal processing portion of the preferred embodiment of this invention, as shown in FIG. 3, that the gain of current to voltage converters 300 and 301 should be adjusted to yield a predetermined voltage e.g. typically two to five volts peak to peak. The respective signals from current to voltage converter 300 and current to voltage converter 301 are then A.C. coupled to fixed gain amplifiers 305 and 306, respectively, with the output therefrom being clipped fifteen volt signals which are then transmitted through respective phase locked loops 310 and 312 for providing additional noise rejection. Voltage controlled oscillators 314 and 316, in the respective phase locked loops 310 and 312, are utilized for phase measurement with the respective signals from phase locked loops 310 and 312 being coupled to the input of exclusive OR gate 320, the output of exclusive OR gate 320 being provided with low pass filtering in 12 pole Butterworth type filter 321 to provide a voltage output from digital voltmeter 322 which is proportional to angle with a dynamic range equal to one-half the carrier frequency.

Figure 4:
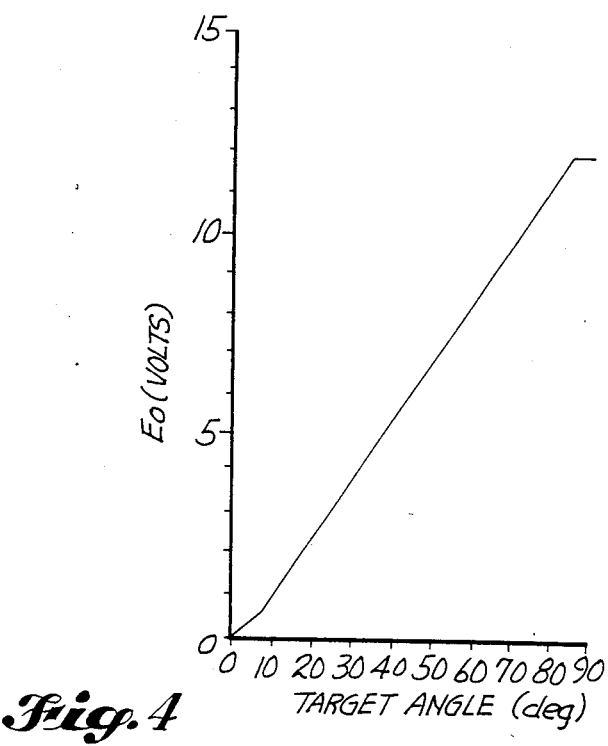
FIG. 4 is a typical response curve for the rotating polarizer angle sensing system of FIGS. 2 and 3 over the angle range of from zero to 90° of the present system embodiment.

Turning to FIG. 4, it can be seen in the graph showing $E_0$ from the system of FIG. 3 as a function of target angle that the angle range of the system of FIGS. 2 and 3 over 90° as provided, a typical response curve being shown in FIG. 4. Accuracy at 95 percent confidence at a range of four meters is 0.025°. In actual operation, the present system, in bright sunlight, has been shown to provide, at a range of thirty meters, a similar accuracy.

While a laser source input light source utilizing laser 101 and one-fourth wave plate 102 is shown in the system of FIG. 2, in a non-laser source (incandescent) embodiment of the system of FIG. 2A, an input light source 402 using a high intensity lamp coupled through a lens, stop, and further lens may be utilized in place of laser 101 and one-fourth wave plate 102 in the system of FIG. 2.

What is claimed is:

1. A system for measuring angular determination of aircraft structure, including wing twist in flight and position of actuated control surfaces, said system comprising:
    a linearly polarized light source consisting of linearly polarized continuous wave laser:
    a ¼ wave retardation plate disposed at the output beam of said linearly polarized light source for providing a beam of circularly polarized light;
    a rotating linear polarizer rotating at a constant speed for converting said circularly polarized light beam into a modulated beam of linearly polarized light which has a plane of polarization rotating at twice the speed of said rotating linear polarizer;
    a negative lens inserted into said modulated beam for providing the first element of a telescope utilized for focussing said modulated beam on a target;
    a beam splitter for dividing said modulated beam into a reference beam and a test beam;
    a linear polarizer for demodulating said reference beam and establishing a reference optical signal of known phase angle determined by the polarization plane of said rotating linear polarizer;
    a photo-voltaic cell for converting said reference optical signal to an electric reference signal;
    an object lens utilized in combination with said negative lens to focus said modulated beam on said target;
    said target consisting of a retro-reflector and a linear polarizer, whereby said modulated beam becomes a reflected beam of linearly polarized light;
    a lens system including a positive lens for collecting said reflected light from said target;
    a first surface mirror for redirection of said reflected light to a photo-voltaic cell receiver;
    a lens for focussing said reflected light on said receiver;
    a filter for controlling the intensity of said reflected light to the linear range of said receiver;
    said receiver converting said reflected light to an electric test signal; and,
    a phase detection circuit for measuring phase angle between said reference signal and said test signal.

* * * * *